US008029607B2

(12) United States Patent
Ray

(10) Patent No.: US 8,029,607 B2
(45) Date of Patent: Oct. 4, 2011

(54) CLEANING PRESSURE REDUCTION THROUGH BLOWPIPES

(75) Inventor: Andrew Ray, Kansas City, MO (US)

(73) Assignee: BHA Group, Inc., Kansas City, MO (US)

(*) Notice: Subject to any disclaimer, the term of this patent is extended or adjusted under 35 U.S.C. 154(b) by 127 days.

(21) Appl. No.: 12/434,046

(22) Filed: May 1, 2009

(65) Prior Publication Data

US 2010/0275776 A1 Nov. 4, 2010

(51) Int. Cl.
*B01D 46/04* (2006.01)
(52) U.S. Cl. ............................................. 95/280; 55/302
(58) Field of Classification Search ............ 55/301, 55/302, 303, 304, 305; 95/278, 279, 280; 96/428; 15/405–408
See application file for complete search history.

(56) References Cited

U.S. PATENT DOCUMENTS

| | | | | |
|---|---|---|---|---|
| 3,798,878 A * | 3/1974 | Pausch | ................ | 95/280 |
| 4,293,320 A * | 10/1981 | Robinson | ................ | 96/427 |
| 4,433,986 A * | 2/1984 | Borst | ................ | 96/428 |
| 4,468,240 A * | 8/1984 | Margraf | ................ | 55/290 |
| 4,539,025 A * | 9/1985 | Ciliberti et al. | ................ | 55/302 |
| 5,002,594 A * | 3/1991 | Merritt | ................ | 55/302 |
| 5,242,472 A * | 9/1993 | Sellakumar | ................ | 95/280 |
| 5,361,452 A * | 11/1994 | Horn | ................ | 15/406 |
| 5,562,746 A * | 10/1996 | Raether | ................ | 55/302 |
| 5,616,171 A * | 4/1997 | Barris et al. | ................ | 95/280 |
| 5,837,017 A | 11/1998 | Santschi | | |
| 6,077,490 A * | 6/2000 | McIlroy et al. | ................ | 423/215.5 |
| 6,332,902 B1 * | 12/2001 | Simonsen et al. | ................ | 55/302 |
| 7,082,640 B2 * | 8/2006 | McCutchen | ................ | 15/352 |
| 2004/0079231 A1 * | 4/2004 | Green et al. | ................ | 95/280 |
| 2007/0157809 A1 * | 7/2007 | Ehlers | ................ | 95/280 |
| 2008/0127828 A1 * | 6/2008 | Raether | ................ | 95/280 |

\* cited by examiner

*Primary Examiner* — Duane Smith
*Assistant Examiner* — Thomas McKenzie
(74) *Attorney, Agent, or Firm* — Pearne & Gordon LLP

(57) ABSTRACT

A system for cleaning at least one filter in a baghouse and an associated method for providing the system. The at least one filter separate a dirty gas chamber from a clean gas chamber, and filters at least one substance from a gas. The system includes a supply of compressed air and a blowpipe to direct the air at the at least one filter to dislodge a collected amount of the at least one substance from the at least one filter. The blowpipe has a cross-sectional flow area through which the compressed air flows. A valve controls provision of the compressed air. The valve has a cross-sectional flow area though which the compressed gas flows. The cross-sectional area of the valve is smaller than the cross-sectional area of the blowpipe to provide for air pressure at the valve to be greater than air pressure at the blowpipe.

15 Claims, 2 Drawing Sheets

US 8,029,607 B2

CLEANING PRESSURE REDUCTION THROUGH BLOWPIPES

BACKGROUND OF THE INVENTION

1. Field of the Invention

The present invention relates generally to a system for cleaning filters in a baghouse, and more particularly, to a piping arrangement for pulse jet dust collectors for cleaning filters in a baghouse.

2. Discussion of the Prior Art

Filters for removing particulates from a particulate-laden gaseous stream flowing through a baghouse are known. The particulates are typically generated by an industrial process and carried to the filters in the gas flow stream. The filters include media that is formed into filter cartridges or filter bags, etc. The particulate-laden gas flows through the filters from outside towards inside. The particulates are separated from the gas stream at the outer side of the filters. The filtered gas stream flows through the media and exits the filter through an open end. The filtered gas stream then is conducted to subsequent plant uses or the atmosphere.

Over time, an increasing buildup of accumulated particulates forms on the outer sides of the filters. This increasing buildup of particulates causes an increase in pressure drop across the filters. This increased pressure drop may result in increased operation cost because more power is consumed to generate an effective flow of gas through the filters.

The filters are periodically cleaned to remove the particulate buildup and reduce the pressure drop across the filters. To clean the filters, a pressurized fluid, such as air, is blown into the open end of the filters to dislodge the particulate buildup adhering to their outer sides. Known cleaning systems typically provide a pulse of compressed air into the filters at a supplied pressure in the range of about 60 psi to 100 psi (414 kilopascals to 690 kilopascals).

Some known baghouses require a large volume of pressurized fluid in order to obtain a desired filter cleaning. The large volume of fluid is provided by large pressurized tanks that store the fluid prior to use. Only a limited number of manufacturers and testing facilities can build and test the large tanks.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a system for cleaning at least one filter in a baghouse. The baghouse has a dirty gas chamber and a clean gas chamber. The at least one filter separate the dirty gas chamber from the clean gas chamber. The at least one filter filtering at least one substance from a gas as the gas passes from the dirty gas chamber to the clean gas chamber through the at least one filter. The system includes a supply of compressed air and a blowpipe to direct the compressed air at the at least one filter to dislodge a collected amount of the at least one substance from the at least one filter. The blowpipe has a cross-sectional flow area through which the compressed air flows. A valve is interposed between the supply of compressed air and the blowpipe for controlling provision of the compressed air from the supply. The valve has a cross-sectional flow area though which the compressed gas flows. The cross-sectional area of the valve is smaller than the cross-sectional area of the blowpipe to provide for air pressure at the valve to be greater than air pressure at the blowpipe.

In accordance with another aspect, the present invention provides a method of providing a system for cleaning at least one filter in a baghouse. The baghouse has a dirty gas chamber and a clean gas chamber. The at least one filter separate the dirty gas chamber from the clean gas chamber. The at least one filter filtering at least one substance from a gas as the gas passes from the dirty gas chamber to the clean gas chamber through the at least one filter. The method includes providing a supply of compressed air. The method provides a blowpipe to direct the compressed air at the at least one filter to dislodge a collected amount of the at least one substance from the at least one filter. The blowpipe has a cross-sectional flow area through which the compressed air flows. The method provides a valve interposed between the supply of compressed air and the blowpipe for controlling provision of the compressed air from the supply. The valve has a cross-sectional flow area though which the compressed gas flows. The cross-sectional area of the valve is smaller than the cross-sectional area of the blowpipe to provide for air pressure at the valve to be greater than air pressure at the blowpipe.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
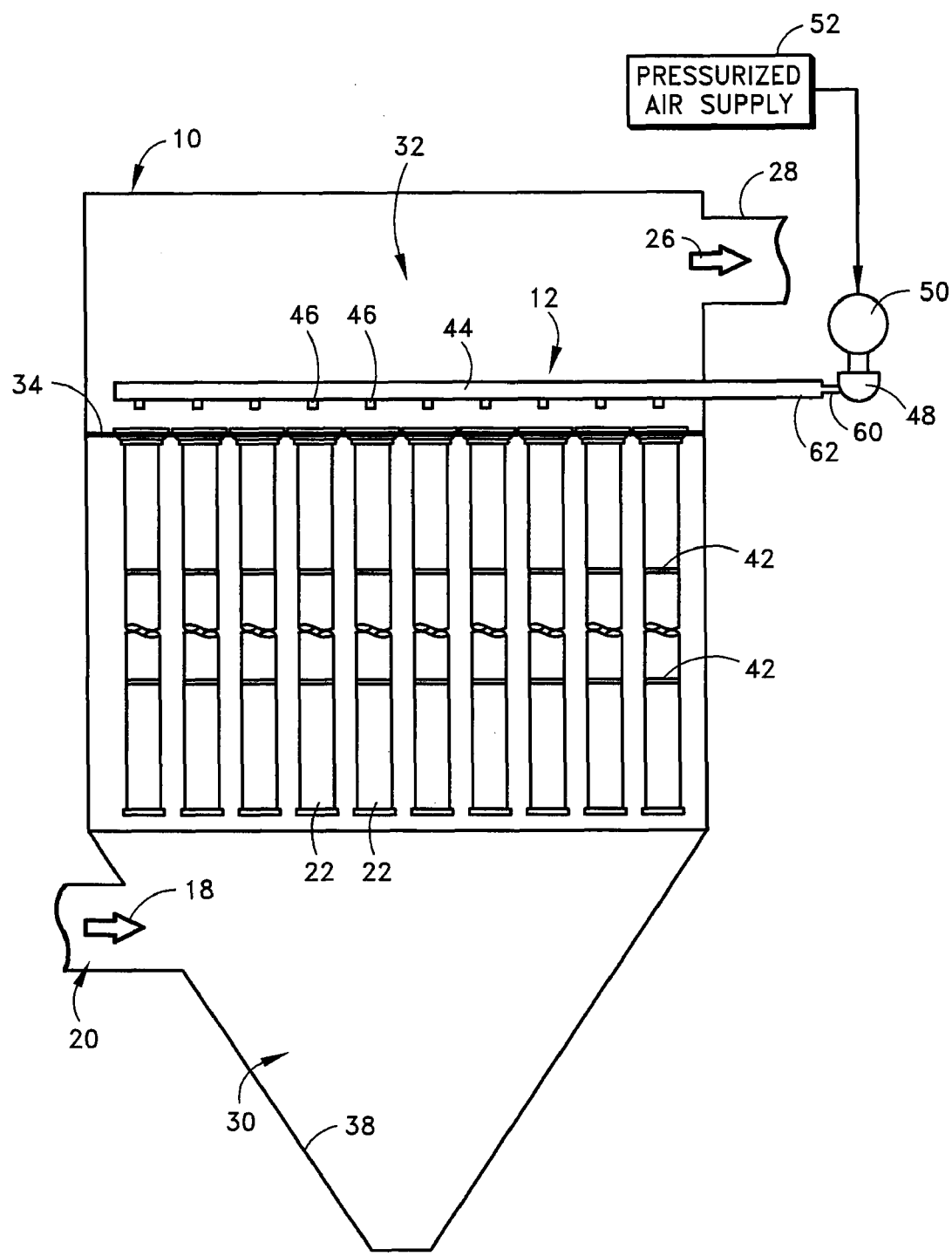
FIG. 1 is a schematic illustration of an example baghouse arrangement that includes a system for cleaning in accordance with one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The invention relates generally to a system for cleaning at least one filter in a baghouse with reverse pulses of the pressurized air. In one specific example, the system may be integrated into an initial construction of a baghouse. In another specific example, the system may be a retrofit into an existing baghouse. Such choice (i.e., initial construction or retrofit) is not a limitation on the present invention.

Turning to the shown example of FIG. 1, a baghouse 10 incorporating a filter cleaning system 12 is schematically illustrated. It is to be understood that the following provides a description of one example baghouse 10, and that the filter cleaning system 12 in accordance with the present invention can be utilized in various baghouses having various configurations. Particulate-laden gas 18 flows into the baghouse 10 from an inlet 20. The particulate-laden gas 18 is filtered by a plurality of filters 22 located within the baghouse 10. The filters 22 may be of varied construction. Typically, the filters are generally cylindrical in shape. One example type of filters is referred to as a candle filter. Filtered or clean gas 26 exits through an outlet 28 of the baghouse 10.

The baghouse 10 is divided into a "dirty gas" plenum or chamber 30 and a "clean gas" plenum or chamber 32 by a tubesheet 34 made from a suitable material, such as sheet metal. The tubesheet 34 supports the filters 22 such that the filters extend into the dirty gas chamber 30. The inlet 20 is in fluid communication with the dirty gas chamber 30. The outlet 28 is in fluid communication with the clean gas chamber 32. The dirty gas chamber 30 of the baghouse 10 may also have an accumulation chamber defined by sloped walls 38 located at a lower end of the dirty gas chamber 30. The accumulation chamber receives and temporarily stores particulates and other debris that separate from the particulate-laden gas 18 or fall off of the filters 22. The stored particulates and debris may exit the accumulation chamber through an opening or the like.

In one example, the tubesheet 34 includes a plurality of openings (not shown) extending there through. A respective one of the filters 22 is installed in each respective one of the openings. Each of the filters 22 is mounted within the respective opening so it seals against the tubesheet 34 and isolates the dirty gas chamber 30 from the clean gas chamber 32. While the filters 22 are illustrated as being mounted to extend in a substantially vertical direction, the filters could be mounted to extend in any direction, for example horizontally or at an angle. By way of example and not limitation, a circumferential resilient mounting band (not shown) can be located in each one of the openings in the tubesheet 34. The band provides the seal between the respective filter 22 and the opening in the tubesheet 34, and any suitable mounting structure may be used to attach, support and seal the filters 22 to the tubesheet 34.

As mentioned, the filters 22 filter particulates from the particulate-laden gas 18 as the gas passes through each filter. Each filter 22 can include conventional bags and cages, and/or may include pleated filter media. For example, the filter media can be formed into a tubular configuration with a circular cross section. It will be apparent that the filters 22 may be any desired length in order to meet the filtering requirements of the baghouse 10. The filter media may be constructed of any suitable material for desired filtering requirements and operating conditions. For example, materials such as polyester, acrylic and polypropylene are generally acceptable for operating temperatures in the range of 180° F. to 225° F. (82° C. to 107° C.). Aramid and PPS are suitable for up to 375° F. (191° C.). Fiberglass is suitable for use up to 450° F. (232° C.).

The filters 22 are illustrated as having retention devices 42 (FIG. 1) extending circumferentially about the pleated filter media. It is to be understood that conventional filters using bags and cages generally do not include such retention devices 42. However, where pleated filter cartridges are used, the retention devices 42 serve to hold the pleated filter media in place during reverse pulse cleaning of the filters 22. Specifically, the retention devices 42 limit movement of the pleated filter media in a radial outward direction during reverse pulse cleaning. The retention devices 42 may be in the form of a strap or an extruded elastomer.

The example embodiment of the filter cleaning system 12 is a reverse pulse cleaning system and includes at least one blowpipe 44. The number of blowpipes 44 may be varied and may be dependent upon the number of filters 22 used within the baghouse 10. A baghouse 10 that has a multitude of filters 22 that may be arranged in an array may include multiple blowpipes 44. The blowpipes 44 are arranged in cooperation with the filters 22. Specifically, the blowpipes 44 are routed/directed so that each blowpipe extends in close proximity to a group of filters. Thus, each group of filters has an associated blowpipe. For ease of visualization, FIG. 1 only shows a single blowpipe and a single group of associated filters. It is to be appreciated that multiple blowpipes and multiple groups of associated filters may be present in the example of FIG. 1.

Located on each blowpipe is a plurality of nozzles 46. Each nozzle 46 is associated with a filter 22 and is oriented/pointed such that air flowing from the blowpipe 44 through the nozzle is directed into the respective filter. Associated with each blowpipe 44 is a valve 48. Thus, there is a plurality of valves 48 within the filter cleaning system 12. In one example, the valves 48 are pulse valves, however it is possible that other valves could be used. Going forward, the valves 48 are described as pulse valves with the understanding that the invention may not be so limited. For ease of visualization, FIG. 1 only shows a single pulse valve 48 with the shown single blowpipe 44. It is to be appreciated that a different number of pulse valves 48 may be present in the example of FIG. 1.

The pulse valve 48 is connected to a header pipe 50, which in turn is connected (shown schematically) to a pressurized air supply 52. The header pipe 50 may be connected to multiple pulse valves 48 which are in turn connected to multiple blowpipes 44. In the alternative there may be a singular correspondence between a header pipe 50 and a pulse valve 48 and thus there may be plural header pipes for plural pulse valves.

With regard to the pressurized air, the content thereof is not to be a limitation on the present invention. For example, the pressurized air may contain or include various gasses and/or combinations thereof. For example, additive gases may be included with atmospheric air. The phrase "pressurized air" is to be interpreted to include such variations. The phrase "pressurized air" is only used for ease of reference.

Going forward for swiftness, further discussion will be directed to just the single header pipe 50, the single pulse valve 48, the single blowpipe 44, the single group of associated filters 22 and associated structure. However, it is to be appreciated that such discussion may be equally applicable to the multiples of the pulse valves, blowpipes, filter groups, associated structures, etc. as may be present.

The general operation of the filter cleaning system 12 is based upon the use of air from the pressurized air supply 52 to clean off accumulated particulate matter from the filters 22. The pressurized air is transmitted to the pulse valve 48 via the header pipe 50. The pulse valve 48 is controlled to open, which allows the pressurized air to travel along the blowpipe 44 and be discharged from the nozzles 46. This discharge from the nozzles 46 is a pulse of air that is transmitted into the filters 22. This pulse of air dislodges particulate that has accumulated upon the filters 22. The dislodged particulate may proceed down within the accumulation chamber (i.e., along the sloped walls 38) for removal there from as discussed above. This can be referred to as the cleaning process.

It is to be appreciated that in order to achieve the desired result during the cleaning process, it is necessary to have a sufficient volume of air and with a sufficient force due to pressure, emitted from the nozzles 46 to cause the particle dislodgement or cleaning. Of course, the volume of air will be somewhat dependent upon the particulars of the baghouse 10. Such particulars may include size of the filters 22, configuration of the blowpipes 44 and filters, etc. Even the type, size and volume of the particulate accumulation may be a factor in the needed volume of air for cleaning.

Figure 2:
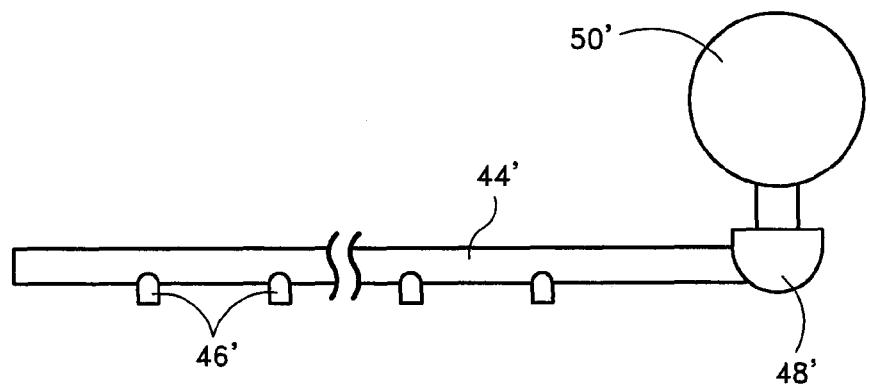
FIG. 2 is a schematic example illustration of a portion of a prior art system for cleaning.

In a known prior arrangement, the sufficient volume of air was provided via a provision of a rather large vessel for containing the pressurized air supply, and a rather large header pipe distribution to rather large pulse valves. Some details of an example of such a known prior arrangement are shown in FIG. 2. Specifically, a 14 inch (36 cm) header pipe 50' transmits pressurized air at 45 psi (310 kilopascals). A 4 inch (approx. 10.2 cm) pulse valve 48' is connected directly to a 4 inch (approx. 10.2 cm) blowpipe 44'. The 4 inch (approx. 10.2 cm) blowpipe 44' transmits pressurized air through the nozzles 46'. It is to be appreciated that the pipes shown in the example have circular cross-sections and the cross-sectional flow areas are related to the diameters. Of course, the pipes may have cross-sections that are other than circular.

When the relatively large pulse valve 48' is open, the flow of pressurized air is 45 psi (310 kilopascals) within the blowpipe 44'. However, it is to be appreciated that the relative large components, and in particular the vessel and the header pipe 50', have commensurate large material and construction aspects. Such large material and construction aspects may be associated with commensurate large costs. Such large costs may be a factor of cost for constituent materials, such as steel.

Figure 3:
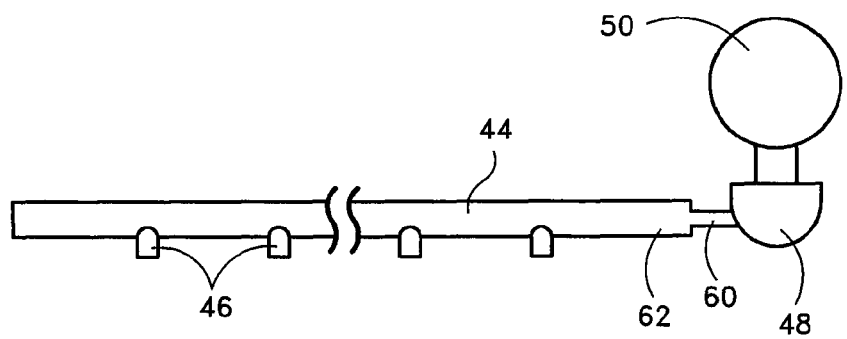
FIG. 3 is a schematic illustration similar to FIG. 2, but shows an embodiment in accordance with an aspect of the present invention.

FIG. 3 shows one example embodiment of components of the filter cleaning system 12 (shown in FIG. 1) in accordance with the present invention. The header pipe 50 is smaller than the counterpart shown within FIG. 2. In the specific shown example, the header pipe 50 has a diameter of 8 inches (approx. 20.3 cm). The pulse valve 48 is also smaller than the counterpart shown in FIG. 2. In the specific example, the pulse valve 48 is a 2 inch (approx. 5.1 cm) pulse valve. In the shown example, the blowpipe 44 is still 4 inches (approx. 10.2 cm). However, a nipple plate 60 has been included between the pulse valve 48 and the blowpipe 44. In the shown example, the nipple plate 60 has a circular cross-section and has a 2 inch (approx. 5.1 cm) diameter.

Figure 4:
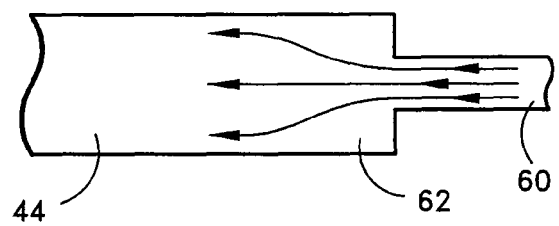
FIG. 4 is an enlarged portion of the embodiment shown in FIG. 3.

In the shown example, pressurized air is provided from the supply at 90 psi (620 kilopascals). Thus, the air pressure from the supply is greater than as provided within the known prior arrangement. The pressure within the header pipe and the pulse valve is 90 psi (620 kilopascals). Upon actuation of the pulse valve 48, the pressurized air at the greater pressure is transmitted through the valve and along the nipple plate 60. As can be seen in FIG. 4, at the junction between the nipple plate 60 and the blowpipe 44, the pressurized air encounters an increased cross-sectional area within which to proceed. Specifically, air is transitioning from the 2 inch (approx. 5.1 cm) nipple plate 60 to the 4 inch (approx. 10.2 cm) blowpipe 44. The area of the blowpipe 44 immediately adjacent to the nipple plate 60 may be referred to as an expansion zone 62. In the shown example, the desired pressure of 45 psi (310 kilopascals) is achieved via the use of smaller components upstream of the blowpipe and the use of increased pressure from the pressurized air supply 52.

The smaller header pipe 50 requires less material, such as steel, to construct as compared to the header pipe 50' of the known prior arrangement of FIG. 2. Also, a smaller pressurized air supply could be employed as compared to the air supply of the known prior art arrangement. The smaller vessel would be configured to retain the pressurized air at the greater pressure. Similar to the reduction in size of the header pipe, the reduction in size of the vessel would require less material, such as steel, to construct as compared to the vessel of the known prior arrangement.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed:

1. A system for cleaning multiple filters in a baghouse, the baghouse having a dirty gas chamber and a clean gas chamber, the filters separating the dirty gas chamber from the clean gas chamber, the filters filtering at least one substance from a gas as the gas passes from the dirty gas chamber to the clean gas chamber through the filters, the system including:
    a supply of compressed air;
    a blowpipe to distribute and direct the compressed air at the filters to dislodge a collected amount of the at least one substance from the filters, the blowpipe having a cross-sectional flow area through which the compressed air flows; and
    a valve interposed between the supply of compressed air and the blowpipe for controlling provision of the compressed air from the supply, the valve having a cross-sectional flow area through which the compressed gas flows, the cross-sectional area of the valve being smaller than the cross-sectional area of the blowpipe to provide for air pressure at the valve to be greater than air pressure at the blowpipe, wherein air pressure of the compressed air at the supply is greater than air pressure of the compressed air directed to the filters.

2. A system as set forth in claim 1, wherein the cross-sectional area of the blowpipe is circular with a diameter and the cross-sectional area of the valve is circular with a diameter, with the diameter of the blowpipe cross-sectional area being approximately twice the diameter of the valve cross-sectional area.

3. A system as set forth in claim 2, wherein the diameter of the valve is approximately 2 inches (approx. 5.1 cm) and the diameter of the blowpipe is approximately 4 inches (approx. 10.2 cm).

4. A system as set forth in claim 1, wherein the valve includes a nipple plate for connection of the valve to the blowpipe, the nipple plate having a cross-sectional flow area through which the compressed gas flows, the cross-sectional area of the nipple plate being smaller than the cross-sectional area of the blowpipe to provide for air pressure at the nipple plate to be greater than air pressure at the blowpipe, a volume within the blowpipe adjacent to the nipple plate being an expansion zone within which the compressed air expands and reduces pressure.

5. A system as set forth in claim 1, wherein the air pressure at the valve is approximately twice the air pressure at the blowpipe.

6. A system as set forth in claim 5, wherein the air pressure at the valve is approximately 90 psi (620 kilopascals) and the air pressure at the at least one blowpipe is approximately 45 psi (310 kilopascals).

7. A system as set forth in claim 1, wherein the valve is a pulse valve.

8. A method of providing a system for cleaning multiple filters in a baghouse, the baghouse having a dirty gas chamber and a clean gas chamber, the filters separating the dirty gas chamber from the clean gas chamber, the a filters filtering at least one substance from a gas as the gas passes from the dirty gas chamber to the clean gas chamber through the filters, the method including:

providing a supply of compressed air;

providing a blowpipe to direct the compressed air at the filters to dislodge a collected amount of the at least one substance from the filters, the blowpipe having a cross-sectional flow area through which the compressed air flows; and providing a valve interposed between the supply of compressed air and the blowpipe for controlling provision of the compressed air from the supply, the valve having a cross-sectional flow area through which the compressed gas flows, the cross-sectional area of the valve being smaller than the cross-sectional area of the blowpipe to provide for air pressure at the valve to be greater than air pressure at the blowpipe, wherein air pressure of the compressed air at the supply is greater than air pressure of the compressed air directed to the filters.

9. A method as set forth in claim 8, wherein the step of providing the blowpipe includes providing the blowpipe to have a circular cross-sectional area with a diameter, the step of providing the valve includes providing the valve to have a circular cross-sectional area with a diameter, with the diameter of the blowpipe cross-sectional area being approximately twice the diameter of the valve cross-sectional area.

10. A method as set forth in claim 9, wherein the step of providing the valve includes providing a nipple plate for connection of the valve to the blowpipe, the nipple plate having a cross-sectional flow area through which the compressed gas flows, the cross-sectional area of the nipple plate being smaller than the cross-sectional area of the blowpipe to provide for air pressure at the nipple plate to be greater than air pressure at the blowpipe, a volume within the blowpipe adjacent to the nipple plate being an expansion zone within which the compressed air expands and reduces pressure.

11. A method as set forth in claim 9, wherein the steps of providing the blowpipe and valve include providing the blowpipe and the valve to have a cross-sectional areas relatively sized such that air pressure at the valve is approximately 90 psi (620 kilopascals) and the air pressure at the at least one blowpipe is approximately 45 psi (310 kilopascals).

12. A method as set forth in claim 8, wherein the valve is a pulse valve.

13. A system as set forth in claim 1, wherein the blowpipe is configured to direct compressed air through a nozzle to the filters to dislodge a collected amount of the at least one substance from the filters.

14. A system as set forth in claim 13, wherein air pressure of the compressed air from the supply and through the valve remains substantially constant.

15. A system as set forth in claim 14, wherein air pressure of the compressed air from the blowpipe to the nozzle remains substantially constant.

\* \* \* \* \*